United States Patent [19]

Talbert

[11] 4,028,447

[45] June 7, 1977

[54] METHOD OF PRILLING MATERIAL

[75] Inventor: Norwood K. Talbert, Manlius, N.Y.

[73] Assignee: Agway, Inc., DeWitt, N.Y.

[22] Filed: Apr. 1, 1976

[21] Appl. No.: 672,653

Related U.S. Application Data

[63] Continuation-in-part of Ser. No. 354,592, April 26, 1973, abandoned.

[52] U.S. Cl. .................................... 264/8; 264/14
[51] Int. Cl.² ............................................ B01J 2/04
[58] Field of Search ............... 264/13, 14, 8; 425/6

[56] References Cited

UNITED STATES PATENTS

| | | | |
|---|---|---|---|
| 3,272,615 | 9/1966 | Hoffman et al. | 264/15 |
| 3,615,142 | 10/1971 | Dahlbom | 264/13 |
| 3,739,049 | 6/1973 | Honjo | 264/14 |

*Primary Examiner*—Robert F. White
*Assistant Examiner*—James R. Hall
*Attorney, Agent, or Firm*—Christel & Bean

[57] ABSTRACT

A method of prilling material in a prilling tower having the usual means for discharging molten material at the upper end thereof in droplet form to fall freely downwardly therein whereby the droplets cool and solidify in spherical or spheroidal form. A manifold extends about the interior of the upper portion of the tower and directs a continuous spray of water against the interior wall of the tower to provide a falling film of water along such wall substantially entirely about the interior circumference of the prilling chamber to cool the chamber and thus hasten solidification of the material and also prevent deposit of the material on the tower wall. Relatively fine unprilled particles of material which drift outside of the prilling zone and reach the wall of the tower are entrained with the water which is collected separately from the prills at the bottom of the tower and conducted away from the tower where the entrained material may be recovered and the water may be conducted back to the manifold for reuse or discharged.

4 Claims, 1 Drawing Figure

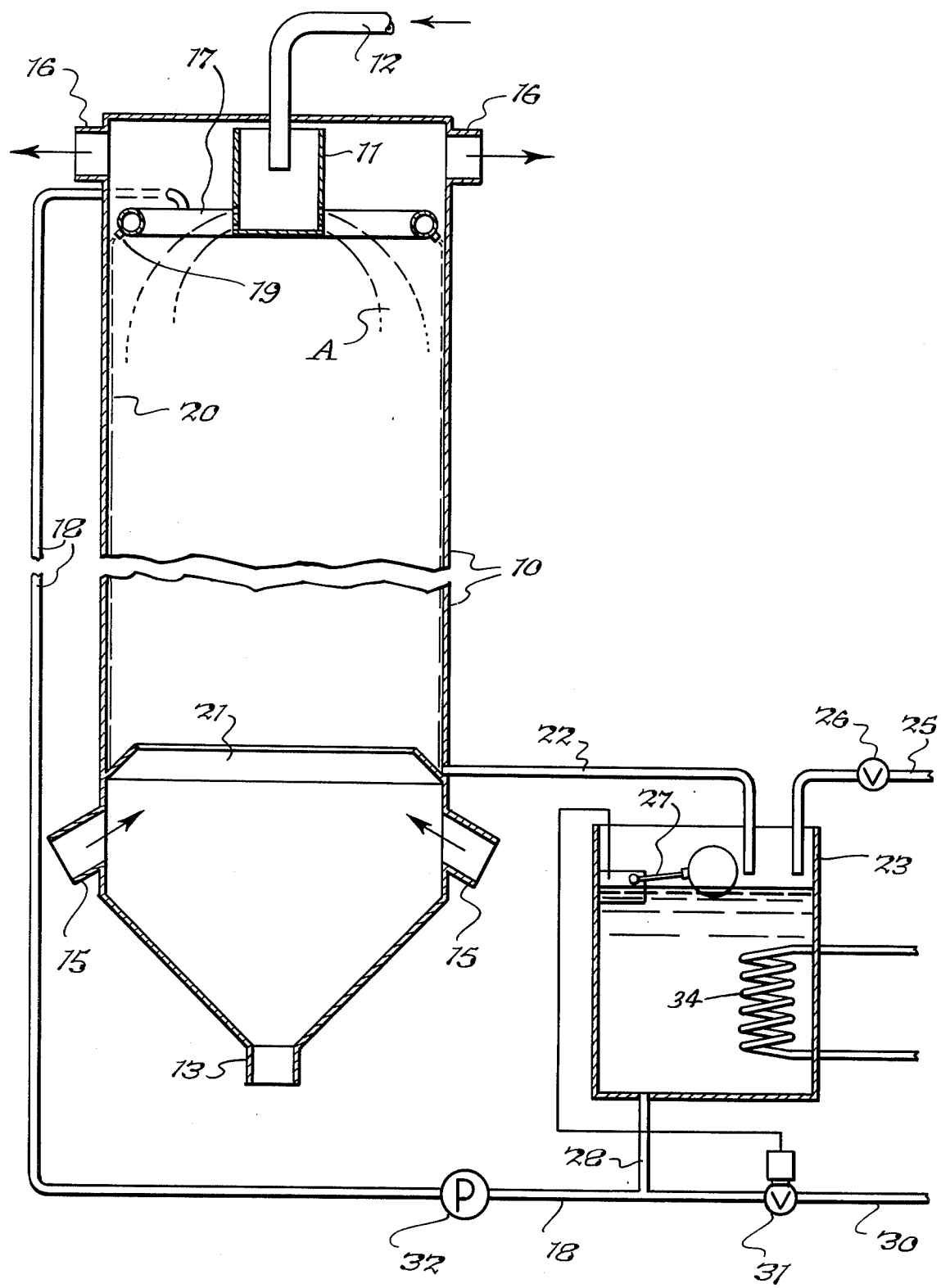

METHOD OF PRILLING MATERIAL

This application is a continuation-in-part of application Ser. No. 354,592 filed Apr. 26, 1973, now abandoned.

BACKGROUND OF THE INVENTION

This invention relates to a method of prilling material and particularly to a method of operation which produces new and improved prilling results.

In prilling molten material the material is discharged into the top of a tower in the form of droplets and the droplets assume a spherical or spheroidal shape in falling through the tower and solidify during their descent. The prilled material thus formed is then gathered or removed from the bottom of the tower. It is conventional to provide a counter current of cooling air which flows upwardly through the tower to hasten the cooling of the droplets.

In conventional prilling methods of the prior art substantial quantities of the air passing upwardly through the tower are released to the atmosphere and such air usually contains finely divided material which produces air pollution.

Furthermore, in most, or at least in many, prilling operations a portion of the material accumulates against the interior walls of the prilling chamber and often builds up to substantial amounts so that ultimately chunks of the matetial fall to the bottom of the tower, causing damage to the structure.

It is well understood in the prilling art that the droplets discharged at the top of the tower must fall freely downwardly through the tower in assume the requisite spherical or spheroidal shape and solidify to form prills. Accordingly conventional devices at the top of the tower for discharging droplets of material are arranged so that the droplets will fall freely out of contact with the walls of the tower since contact with such walls would deform the droplets and not form proper prills.

However, it is found that in prilling operations relatively fine particles of material of a size not large enough to be called droplets are inevitably discharged with the droplets, such fine particles being too small to form the desired prills. These fine particles are of such small size that they tend to drift about in the tower instead of falling directly as do the droplets of proper size to form prills. This drifting about is accentuated by the counter current of cooling air mentioned above which flows upwardly through the tower to hasten the cooling of the droplets. It is these fine unprilled particles which form the undesired accretions of material against the interior walls of the prilling chamber.

SUMMARY OF THE INVENTION

The present invention provides a method of prilling wherein water is discharged against the interior wall of a prilling tower at the upper end thereof to flow downwardly along such wall to a point adjacent to the lower end thereof where it is recovered and diverted from the tower separately from the prilled material.

This flow of water downwardly along the interior wall of the tower provides a substantial cooling influence which reduces the necessity for the aforementioned counter flow of cooling air and in some instances may entirely eliminate such necessity. This reduces the air pollution and discharge of dust to the atmosphere to a very great extent. Furthermore, the flow of cooling water downwardly along the interior wall of the tower substantially prevents accumulations on such wall of the material being prilled, particularly such material as is too fine to form prills and which tends to drift about within the chamber and thus ultimately reach the chamber wall and the water flowing down the same.

BRIEF DESCRIPTION OF THE DRAWING

The single FIGURE of the drawing is a schematic vertical, cross-sectional view of one form of a prilling tower, adapted for use in the method of the present invention.

DESCRIPTION OF A TYPICAL EMBODIMENT

The prilling tower shown in the drawing by way of example may comprise a cylindrical steel stack or tower 10 which, in a typical example, may be about thirty feet in diameter and about one hundred sixty feet high defines an upright prilling chamber. The molten material which is to be converted to solid spheroids may be introduced to the upper end of the chamber in the form of droplets by various means.

In the instance set forth herein by way of example a cylindrical spinner basket 11 is mounted for rotation on a vertical axis and molten material fed thereinto from a supply source 12 is projected therefrom by centrifugal force through perforations in the side wall of the cylindrical basket as indicated at A in the drawing. This means of supplying molten material to the top of a prilling tower in the form of droplets is conventional and need not be further described or illustrated. As indicated earlier, herein the centrifugal force referred to is not sufficient to project droplets of proper size to the walls of the tower.

Various materials may be subjected to prilling by the novel means and method of the present invention. A representative material is urea fertilizer although molten ammonium nitrate and other materials may be similarly treated. The spheroids or pellets of prilled material are gathered and removed from the bottom of the tower by conventional means as for instance by funneling the same into a discharge passage 13.

As indicated earlier herein, it is the general practice to hasten and insure the congealing and setting of the spheroidal particles by passing cool air upwardly through the tower in counterflow to the falling droplets. In conventional operations this requires the flow of substantial volumes of air and the discharge of this air at the top of the tower with finely divided entrained particles of the material being prilled presents a pollution problem.

In the drawing entry ducts for supplying cooling air to flow upwardly through tower 10 and designated 15 and air discharge ducts at the upper end of the tower are designated 16. This illustration of the entry and discharge passages is schematic and the ducts or passages may assume various forms.

In the present invention a film of water is caused to flow downwardly along the interior cylindrical wall of tower 10 in sufficient quantity to provide a continuous water film against the interior wall of the tower. To this end an annular manifold 17 in the upper end of the tower is supplied with water through a conduit 18 and has a circumferential series of nozzles 19 which preferably direct fan sprays of water downwardly and outwardly to the interior wall of the tower to produce the falling film of water indicated at 20 in the drawing. The water supplied to nozzles 19 will usually comprise a solution of the material being prilled, it being referred to in the claims and elsewhere herein as an aqueous liquid.

This film of water or aqueous liquid cools the interior of the tower, prevents accretions on the tower wall of the molten material, and tends to entrain and collect a substantial portion of the finely divided unprilled particles of the material and carry them off separately from the prilled product. It is to be understood that, by and large, the aforementioned accretions on the tower wall consist mainly of finely divided unprilled material. In view of the height of the tower a very considerable portion of the more or less floating and drifting unprilled fine particles will contact the water film at one time or another during the descent of such particles. Thus a substantial part of the unprilled particles is prevented from being delivered from the tower in admixture with the useful prilled product.

At the lower portion of tower 10 an annular ring 21 forms a trough which collects the water which has flowed downwardly along the interior wall of the tower and discharges the same into a conduit 22 which leads to a holding tank 23. The water discharged into the holding tank contains substantial quantities of the material being treated and for certain purposes it is desirable to establish and maintain a predetermined degree of concentration of the material being prilled in the water of the holding tank. To this end a conduit 25 supplies water in an amount which is regulated by a valve 26, such amount being gauged to keep the concentration of prilled material in the water within certain limits. For instance, in prilling urea fertilizer a concentration of from 50% to 70% is desirable.

A float mechanism 27 is provided for maintaining the level of liquid in tank 23. A discharge conduit 28 from the tank diverges and leads to conduit 18 to supply water to manifold 17 and also to an outlet conduit 30 which comprises a purge stream and is provided with an adjustable valve 31 under the control of float mechanism 27. A pump 32 delivers water through conduit 18 to manifold 17. Any excess of water supplied through the make-up conduit 25 to maintain the desired concentration in the water of the holding tank 23 is compensated by the degree of opening of valve 31 in discharge conduit 30 as determined by float mechanism 27. The water discharged through conduit 30 consists of a solution of the material which is being prilled and this water may be treated to recover its content of such material or recycled into the process in any other desired manner.

As stated, it is desirable in the prilling of urea fertilizer to maintain the concentration in holding tank 23 to between 50% and 70% urea. This concentration permits liquid from the holding tank to be passed through conduit 30 to a supply tank (not shown) wherein urea material is in water solution at concentrations corresponding to the above-stated 50% to 70% range. By this means the urea content of the water purged from tank 23 through conduit 30 contains the proper concentration of urea to be directly added to the water solution of urea in supply tank without harmfully affecting the urea concentration thereof so that the purged flow from tank 23 through conduit 30 is fully utilized, as to its urea content, in the preliminary preparation of the urea material for subsequent concentration and melting to supply the prilling tower per se with molten urea.

As indicated in the drawing, a heat exchange coil 34 is provided in holding tank 23 to heat or cool the water therein to maintain a water temperature within a desired range.

Due to the cooling effect of the aqueous liquid film provided in accordance with the present invention, lesser volumes of upwardly flowing air are required to insure solidification of the falling droplets and accordingly the rate of upward movement of air in the tower is considerably slower. This tends to entrain less dust or finely divided material in the cooling air discharging at the top of the tower and also of course releases substantially lesser volumes of air. Both of these factors reduce the discharge of fine unprilled particles of the material to the outside atmosphere, resulting in a much lower pollution level and greater conservation of the material being prilled.

A preferred embodiment of the present invention has been described herein and shown in the accompanying drawing to illustrate the underlying principles of the invention but it is to be understood that numerous modifications may be made without departing from the broad spirit and scope of the invention.

I claim:

1. The method of prilling molten material in a prilling chamber having upper and lower ends and vertical side walls, comprising:
    a. discharging molten material at said upper end of the prilling chamber in droplet form,
    b. cooling said droplets by the falling movement thereof downwardly through said chamber out of contact with the side walls of the chamber to cool the droplets below their melting point to form solid prills before they reach the lower end of the prilling chamber,
    c. directing a spray of aqueous liquid against the interior of said side walls of said prilling chamber to provide a falling film of aqueous liquid along said side walls substantially about the prilling chamber to entrain fine unprilled particles of the material being prilled and to prevent such particles from adhering to the chamber side walls and to promote cooling of the interior of the chamber, and
    d. collecting the downward flow of said aqueous liquid at the lower portion of said side walls separately from the prilled material and conducting the same from said prilling chamber.

2. The method of claim 1 including the step of returning at least a portion of the aqueous liquid thus collected to the supply of aqueous liquid sprayed against the interior wall of said prilling chamber.

3. The method of claim 1 including the step of passing a current of cooling air upwardly through said chamber to promote cooling of said droplets.

4. The method of claim 2 including the step of passing a current of cooling air upwardly through said chamber to promote cooling of said droplets.

* * * * *